United States Patent [19]

Vagias

[11] 4,278,122
[45] Jul. 14, 1981

[54] TRACTION DEVICE FOR A VEHICLE WHEEL

[76] Inventor: Ernest Vagias, 265 Prospect St., Baden, Pa. 15005

[21] Appl. No.: 99,781

[22] Filed: Dec. 3, 1979

[51] Int. Cl.³ .............................................. B60C 27/00
[52] U.S. Cl. ............................... 152/225 C; 152/226; 152/229
[58] Field of Search ....... 152/225 C, 225 R, 226–230, 152/241, 213 R

[56] References Cited

U.S. PATENT DOCUMENTS

| 2,477,051 | 7/1949 | Eisenhauer, Sr. | 152/225 R |
|---|---|---|---|
| 3,103,242 | 9/1963 | Culp | 152/225 C UX |
| 4,089,359 | 5/1978 | Jones | 152/225 R X |
| 4,089,369 | 5/1978 | Lipets et al. | 165/158 |
| 4,129,161 | 12/1978 | Quintana | 152/225 R |

Primary Examiner—William A. Powell
Assistant Examiner—Thomas E. Bokan
Attorney, Agent, or Firm—Thomas H. Murray; Clifford A. Poff

[57] ABSTRACT

A traction device includes traction arms each having a traction finger extending transversely to the treadwall portion of a tire while supported by a shank portion extending to a carrier plate. Pivotal support arms on the carrier plate engage the hub section of the wheel rim by projecting through openings through spoke portions of the rim. The free ends of the support arms engage a hub with a threaded opening received on a threaded shaft that is moved into contact with the axle member of the vehicle and supported by the carrier plate.

9 Claims, 5 Drawing Figures

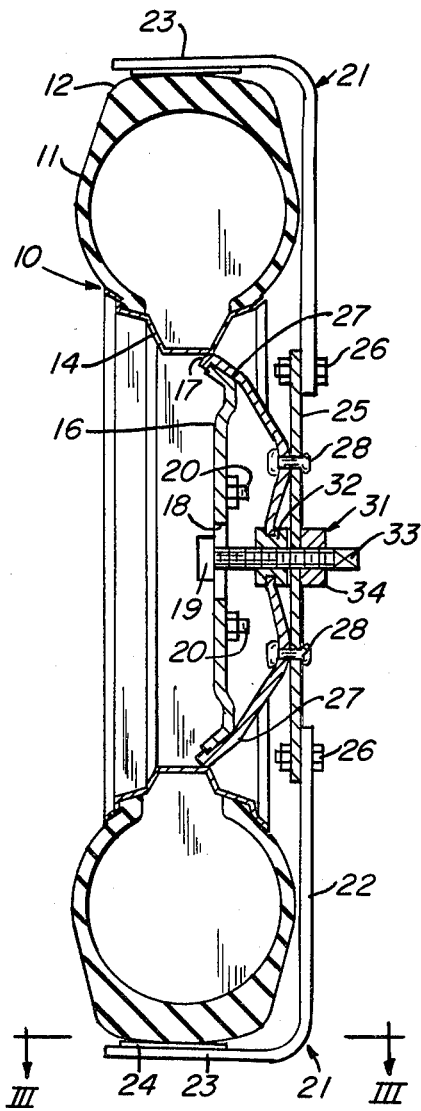
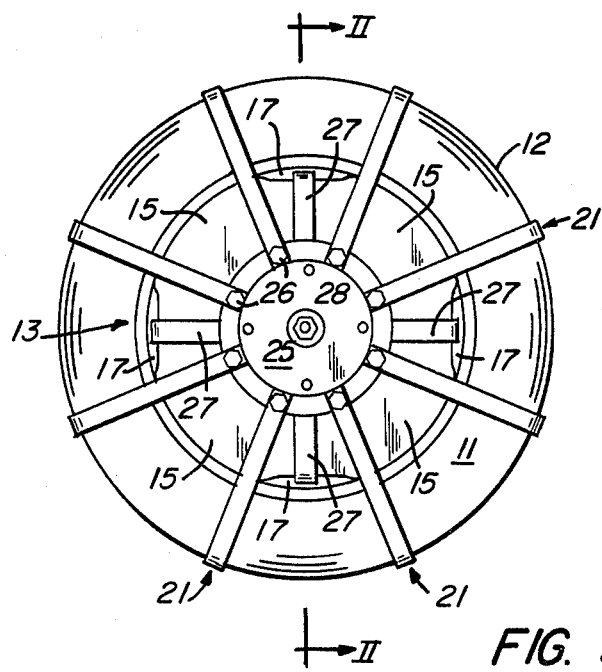
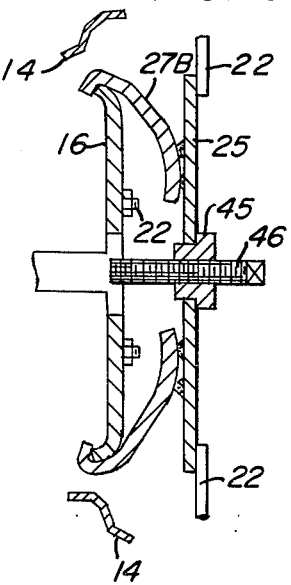
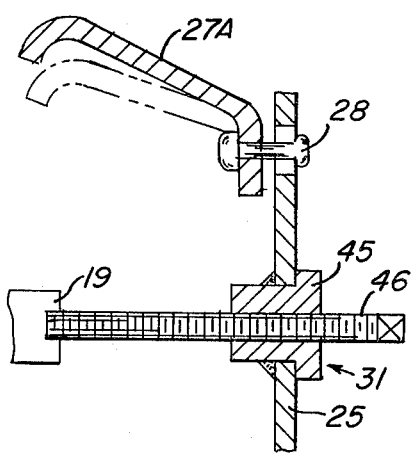
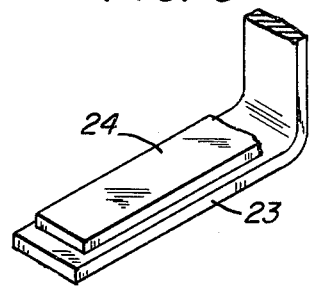

TRACTION DEVICE FOR A VEHICLE WHEEL

BACKGROUND OF THE INVENTION

This invention relates to an anti-skid or traction-aid device for a vehicle wheel assembly, and more particularly for use with a pneumatic tire of an automobile or the like. The apparatus of the present invention is designed for rapid and convenient installation while the vehicle tire remains in contact with the road surface.

A useful alternative to the common practice of employing metallic chains to envelop the tread portion of a vehicle tire is disclosed in my prior U.S. Pat. No. 3,893,497 and essentially includes an anti-skid casing with a treadwall and two spaced-apart side walls that exclude a circular segment sufficient to permit installation into an enveloping relation with a pneumatic tire. The section of the casing which is discarded is selected so that the vehicle tire can remain in continuous contact with the road surface while the casing is installed. A fastener is then installed to span the distance between the terminal ends of the casing and interconnecting them to retain the casing upon the pneumatic tire.

In other forms of anti-skid apparatus, an anti-skid arm is made from a narrow band or strap with a plurality of such arms arranged at spaced-apart locations about a surface of the tire. The manner by which the arms are supported is very important and greatly affects the successful use of the device. One general concept for supporting the anti-skid arms is to mount them onto a plate that is attached by the wheel lug nuts to the studs of the vehicle wheel. Examples of such a support plate are disclosed in U.S. Pat. Nos. 2,397,277; 3,426,824; 3,753,456; 3,996,984 and 4,089,359. The attachment of a support plate in this manner to a wheel assembly usually requires modification to the wheel assembly and/or longer wheel studs to accommodate the support plate which must be removed when not needed. Other forms of support for the anti-skid arms are designed to movably position the arms into supported relation with the tire surface by radially displacing the arms. Examples of such forms of support are shown in U.S. Pat. Nos. 2,601,882; 3,016,079 and 4,122,881. These forms of support are believed less than completely adequate to accommodate the loads and forces that are imposed on the anti-skid apparatus during use and generally require an operating mechanism that protrudes from the exposed side of the vehicle wheel.

SUMMARY OF THE INVENTION

It is an object of the present invention to provide an improved traction device for a vehicle wheel assembly wherein the rim portion thereof is utilized for support without modification and readily useful with the vehicle wheel assembly of diverse designs in a simple and expedient manner.

It is a further object of the present invention to provide a traction device for a vehicle wheel assembly wherein the device includes the use of pivotal support arms arranged to engage the hub section of a vehicle wheel assembly through spoke openings thereof for support by an actuator that engages the axle member of the vehicle to which the wheel assembly is attached.

More particularly, according to the present invention, there is provided a traction device for a vehicle wheel assembly which includes a tire with a treadwall portion supported by a rim having spoke portions with spoke openings therebetween and a hub section removably supported by a vehicle axle member, the traction device comprising a plurality of traction arms each having a shank portion carrying an angularly-projecting traction finger for extending transversely to the treadwall portion of the tire, a carrier plate supporting the shank portions of the traction arms to extend radially along the side of the rim outwardly from the hub section, a plurality of support arms each having a rim-engaging portion at one end for projecting into the spoke openings of the rim, means to support the support arms on the carrier plate for movement into a supported engagement with the rim while extending radially with respect to the tire assembly, and actuator means carried by the support plate for support by the vehicle axle to retain the support arms in supporting engagement with the rim within the spoke hole portions thereof.

It is preferred to construct the traction device of the present invention so that each of the traction fingers includes a frictional surface to contact the treadwall portion of the tire. Such a frictional surface can be defined by a liner or a series of metal protrusions. Metal protrusions, such as studs, may extend from the road facing surface of the traction finger for increased road traction. The aforesaid actuator means in one form includes a hub member carried on the threaded portion of a shaft to pivotally position the support arms by engaging the inboard ends thereof. The inboard end of the shaft is supported by the vehicle axle or wheel. The shaft also extends for rotatable support by a collar on the carrier plate. In another form, the actuator means includes a threaded shaft in a nut member which is attached to the support plate. The shaft butts against the vehicle axle or hub. The support arms are connected by loose rivets or the like to freely move into engagement with the rim and held in place by the outward force on the support plate by the shaft of the actuator means.

These features and advantages of the present invention as well as others will be more fully understood when the following description is read in light of the accompanying drawings, in which:

FIG. 1 is a side elevational view of one embodiment of a traction device on a vehicle wheel assembly according to the present invention;

FIG. 2 is a sectional view taken along line II—II of FIG. 1;

FIG. 3 is a sectional view taken along line III—III of FIG. 2;

FIG. 4 is an enlarged partial side elevational view of a second embodiment of a traction device; and FIG. 5 is an enlarged partial side elevational view of a third embodiment of a traction device.

In FIGS. 1 and 2, reference numeral 10 identifies a vehicle wheel assembly which includes a tire 11 having the usual side wall portions and a treadwall portion 12. The side wall portions of the tire include a bead for support in the usual manner against flanges of a wheel rim 13. These flanges are part of a web section 14 that is attached by spokes 15 to a hub section 16. Spoke holes 17 are defined between the spokes 15. The hub section 16 includes a central opening 18 that is passed over the projected end of the vehicle wheel axle 19. Openings in the hub are passed onto stud members 20 that, in turn, receive lug nuts by which the wheel assembly is retained on the axle assembly of the vehicle.

The embodiment of the traction-aid device of the present invention shown in FIGS. 1–3 includes a plurality of traction arms 21 arranged to extend in a generally radial direction with respect to the vehicle wheel assembly 10. The traction arms can be made from metal strips and each includes a shank portion 22 extending to an angularly-projecting traction finger 23. The traction fingers 23 overlie the treadwall portion 12 of the tire and generally extend from the outside of the tire only to the inside side wall portion. A roughened surface may be provided on each traction finger 23 to maintain effective frictional contact with the treadwall portion 12 of the tire. Such frictional contact can be effectively maintained by knobs, cleats or studs projecting toward the tire from the face surface of the finger facing the tire. However, as shown in FIG. 3, it is preferred to adhere a liner 24 onto the face surface of each traction finger 23 to enhance frictional contact with the treadwall portion 12. The ground contact face surface of the finger 23 preferably includes studs, cleats, knobs or the like to increase frictional contact with the ground surface for increased traction. The liner 24 is typically made from a strip of rubber such as neoprene. The shank portions 22 of the traction fingers extend along the outboard side of the tire along a portion of the rim 13 where they are attached to a carrier plate 25. For each traction arm, at least one bolt 26 is passed through one of spaced-apart openings along the shank portion and through an opening in the carrier plate. A nut is passed onto the projected end of the bolt to form a fastener. Adjustable positioning of the traction arms with respect to the treadwall portion of the tire can be provided by other forms of fasteners and attachment without departing from the spirit of the present invention. The carrier plate 25 supports a plurality of radially-extending support arms 27. Each arm is attached by a pivot 28 so that the radially-projecting end of the support arm can move into and out of supporting contact with rim 13. The outboard end of each support arm is bent in the form of a hook that conforms to the contoured wall surface of the rim defining part of a spoke hole 17 between the spokes 15. Usually four spoke holes are provided in a tire rim of present-day design and, therefore, the present invention contemplates the use of four support arms to engage into a separate one of the spoke holes. The pivot 28 may be formed by the pin of a hinge or preferably by a loose rivet. In the embodiment of FIG. 2, the inboard ends of the support arms extend to an actuator 31 that includes a collar 32 with an outer peripheral recess into which the inboard ends of the support arms are received. The collar has a central bored opening with threads formed therein for mating engagement with threads on the external surface of an actuator shaft 33. A collar 34 attached to the carrier plate supports the outboard end of the shaft so that the outboard end projects from the carrier plate where a squared end remains exposed for attachment to a suitable winch. The inboard end of the shaft is pressed against the end face surface of the axle 19. When the axle includes a hollowed end face surface, then the actuator shaft is moved into contact with the wall forming such a cavity. The inboard end of the actuator shaft, when desired, is provided with a curved or cupped transition plate as required to conform to the configuration of the end of the axle or the central area of the hub section 16.

In the operation of the anti-skid device shown in FIGS. 1 and 2, the traction fingers 23 are positioned over the treadwall portion of the tire by moving the assembly toward the vehicle wheel. During this movement, the anti-skid device is positioned so that the ground-engaging surface of the tire corresponds to the gap between two of the traction arms. The support arms are then moved into the spoke holes so that rotation of the actuator shaft displaces the hooked ends into engagement with the wall of the hub section 16. At the same time, the inboard end of the actuator shaft is supported by the axle member so that the reaction force to the supporting force developed by the support arms is applied to the axle member. In this way, the traction device is firmly held onto the rim of the wheel assembly only at the outboard side thereof. This greatly enhances the placement and removal procedures for the anti-skid device, rendering it particularly suitable for short-term use during short periods of inclement weather. However, the anti-skid device is equally useful throughout extended periods.

Instead of directly coupling the inboard ends of the support arms to the actuator, the embodiment of the present invention shown in FIG. 4 provides that the inboard ends of support arms 27A terminate beyond the pivot 28 at a point sufficient only for support by the pivot. The pivot in this instance is preferably a loose rivet. An actuator 31 includes a nut 45 attached by welding or the like to the support plate 25 and receives the threaded portion of a shaft 46. The outboard end of the shaft has a squared end portion to receive a wrench and the inboard end of the shaft is adapted to abut against the axle 19. Traction fingers are attached to the support plate as described hereinbefore.

In the operation of the embodiment of the anti-skid device shown in FIG. 4, the traction fingers are positioned over the treadwall portion of the tire by moving the assembly toward the vehicle wheel as previously described. The support arms 27A are manually positioned so that the hooked ends thereof move into the spoke holes. Thereafter, shaft 46 is rotated by a wrench to displace the support plate toward the outboard side of the wheel assembly until the hooked ends of the support arms 27A engage with the wall of the hub section 16. The reaction force to the supporting force developed by the support arms and shaft 46 is applied to the axle member.

The embodiment of the present invention shown in FIG. 5 differs from that already described by the rigid attachment of supports 27B through weld metal or other means onto the support plate 25. The outboard ends of the support arms have a sufficient resiliency so that the hooked ends will yield when pressed against the hub section 16 of the tire rim. Yielding of the support arms permits the hooked ends to slip into the spoke holes so that rotation of the shaft 46 draws the hooked ends into engagement with the wall of the hub section 16. It is to be understood that the shaft 46 extends through the threaded portion of stationary nut 45 which is welded onto the support plate. The support plate carries traction arms 21 in the same manner as already described.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A traction device for a vehicle wheel assembly which includes a tire with a treadwall portion supported by a rim having spoke portions with spoke openings therebetween and a hub section removably supported by a vehicle axle member, said traction device comprising a plurality of traction arms each having a shank portion carrying an angularly-projecting traction finger for extending transversely to the treadwall portion of said tire, a carrier plate to support the shank portion of said traction arms while extending radially along the side of said rim outwardly from said hub section, a plurality of support arms supported by said carrier plate to extend radially therefrom so that a rim-engaging portion at one end of each support arm projects into said spoke openings, and actuator means between said carrier plate and the vehicle axle member to force said support arms together with said carrier plate into a position where the rim-engaging portion of each support arm engages against said rim within the spoke hole portions thereof, said actuator means being arranged so that the reaction force to the support force developed by the support arms on the rim is applied to said vehicle axle member.

2. The traction device according to claim 1 further including a frictional surface on each traction finger to contact the treadwall portion of said tire.

3. The traction device according to claim 2 wherein said frictional surface is defined by a liner.

4. The traction device according to claim 1 further including pivot members each to interconnect one of said support arms with said carrier plate.

5. The traction device according to claim 1 wherein said actuator means includes a shaft forming an outboard extension to said vehicle axle member, and a collar adjustably positioned along said shaft while engaging said support arms for movement into supporting engagement with said rim.

6. The traction device according to claim 5 wherein said actuator means further includes a hub member on said carrier plate to support said shaft outwardly of said rim.

7. The traction device according to claim 5 wherein said shaft includes a threaded portion, and said collar includes a threaded opening for mating engagement with the threaded portion of said shaft.

8. The traction device according to claim 1 wherein the rim-engaging portion of each of said support arms includes a bent retention surface.

9. The traction device according to claim 1 wherein each traction finger has a terminal end overlying the treadwall portion of said tire.

* * * * *